April 4, 1950 W. SWARTZ 2,502,635
PACKAGING BAKED GOODS
Filed Sept. 18, 1947
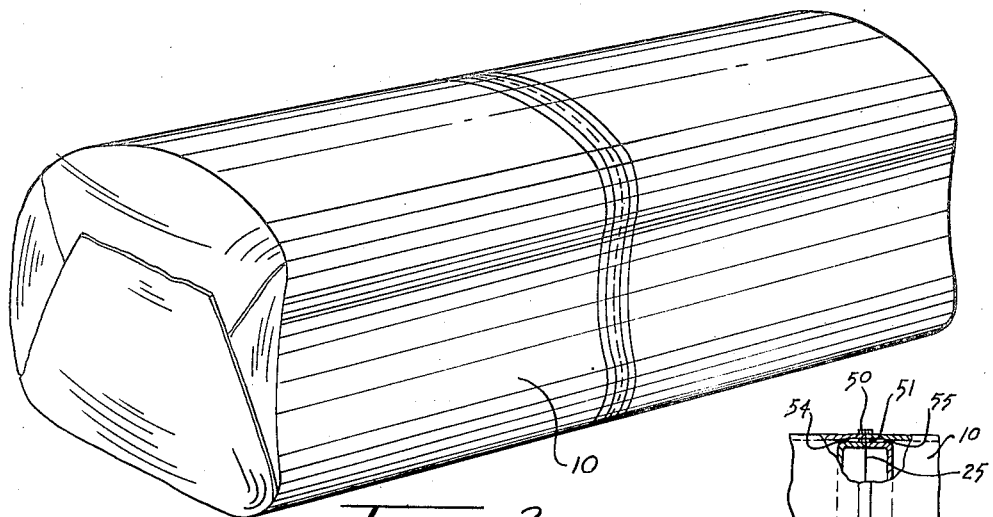
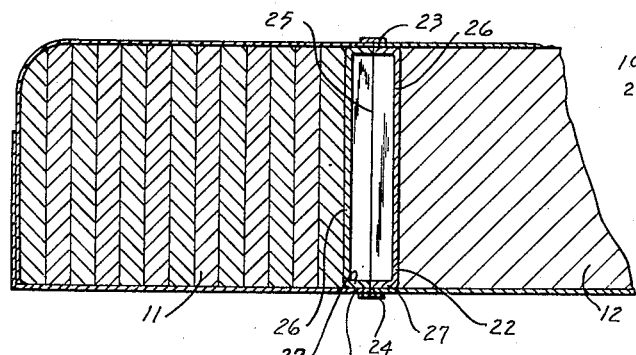
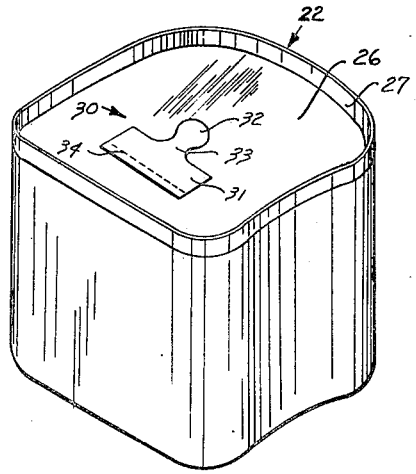
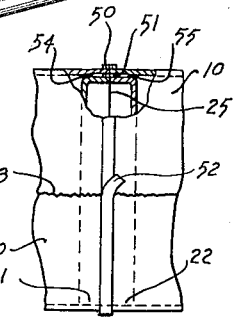
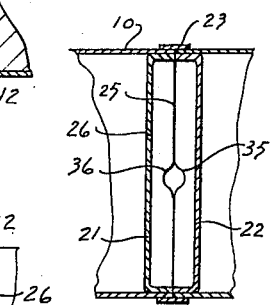
INVENTOR.
WILLIAM SWARTZ
BY
Greene + Durr
ATTORNEYS Patented Apr. 4, 1950

2,502,635

UNITED STATES PATENT OFFICE 2,502,635

PACKAGING BAKED GOODS

William Swartz, Chicago, Ill.

Application September 18, 1947, Serial No. 774,800

6 Claims. (Cl. 99—172)

This invention relates to a wrapped package and the process of making the same. More particularly the invention relates to an improvement in the wrapping and packaging of baked goods such as sliced bread, etc.

An object of this invention is to provide a wrapped package of baked goods such as bread or cake which enables the grocer to sell or the customer to use one half or any predetermined proportion of the goods without exposing the remainder of the goods to the elements.

Another object of the invention is to produce a wrapped loaf of sliced bread which is so wrapped that one can start using the bread from the center portion of the loaf without leaving the remainder of the loaf unprotected.

Another object of the invention is to provide a replaceable closure for fractional portions of wrapped bakery goods which enables one to remove a portion of the goods without tearing the wrapper and to replace the closures to protect the remainder of the unused goods.

Another object of the invention is to provide a wrapper for a combination of different kinds of bread or similar material so that either kind of bread may be removed as desired without disturbing the other portions of the package.

Another object of the invention is to provide a new method for wrapping bread and other similar perishable articles.

Two part loaves have been made heretofore by wrapping two halves of a loaf of bread separately and then wrapping the two wrapped halves. This is a process which requires expensive equipment, three wrappers for each loaf of bread, more time for wrapping, etc., and in addition, it produces a less flexible package making the bread appear less fresh than it really is when handled.

It is an object of the present invention to produce a plural part loaf of bread which does not have these disadvantages.

Another object of the invention is to provide a stiff structural support for the center of a loaf of bread to prevent damage of the bread such as is often caused by the pressure on soft fresh bread (which is almost in a fluid condition) when the loaves are stacked one upon the other.

These objects and others ancillary thereto are obtained by inserting a two part separator of the same cross sectional area as the article or articles to be wrapped prior to wrapping, then wrapping the article and adhering the wrapping to the separator. It is sometimes desirable to place tape around the adjacent edges of the separable parts of the separator. The inside of the separator parts may also be provided with tabs to enable one to lift out the part of the separator and replace it, for example when it is desired to remove only one slice of bread.

The materials which the separator divides may be parts of the same loaf of bread or the bread on either side of the separator may be different types. One part of the loaf of bread may be sliced and one part may be unsliced or the two parts may be sliced to different thicknesses or one part of the loaf may be rye and one part may be white, etc. The invention can also be applied to the wrapping of cake and similar articles.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawing in which:

Figure 1 is a perspective view of a loaf of bread wrapped according to the invention.

Figure 2 is a cross sectional view of a similar loaf of bread wrapped according to the invention.

Figure 3 is a perspective view of one end of a loaf of bread of Figure 2.

Figure 4 is a detail cross sectional view showing a modified form of separation.

Figure 5 is a detail view, partly broken away, of the bottom of a center portion of a loaf of bread showing a modified form of separating means.

Figure 6 is a detail view partly broken away of another form of the separating means.

In the drawing the wrapping is denoted by numeral 10. The wrapping is of the ordinary type and may be done by ordinary wrapping machines. As shown in Figure 2 the loaf of bread which is wrapped comprises one half loaf 11 which is sliced and a half loaf 12 which is unsliced. Between the two half loaves is the separable insert or divider made up of two parts 21 and 22. Each of these parts comprises a flat or disk portion 26 adapted to press against the bread and having a cross sectional area substantially the same as the bread or other materials is wrapped and a flange portion 27 at right angles to the flat or disk portion 26. The portions 21 and 22 which are mirror images of each other, meet along the line 25 and are preferably rather loosely adhered along this line. The portions 21 and 22 may be entirely unadhered or the flange portions 27 of the two parts may be made in one piece which is scored or perforated at the desired line of separation. Preferably at least the outside of the flanges 27 of the separator portions are impregnated with wax or similar waterproofing material and the adherence along the line 25 may be that produced by the wax coating. Obviously the entire areas of the separators may be impregnated with wax or similar material. The wax coating on the separator is preferably of similar material to the wax coating on the wrapping paper 10 and the wrapping 10 is preferably adhered to the flanges 27 of the separator parts. If desired, the wrapping paper 10 may be perforated at 24 so as to make the separation of the paper 10 along the line 25 where the separator parts meet and adhesive tape 23 may be placed so as to protect the package against accidental separation.

As shown in Figure 3 the insert of the separator parts 26 may be provided with a tab 30 to enable one to lift the separated part from the bread, remove a slice of bread, and replace the separable part. As shown the tab is provided with a flat portion 31 which is adhered to the separator and a tab portion 32 which may be bent up from the separator at 33. The tab may be attached to the separator in any known way such as by adhesives or as by sewing as shown by 34.

If desired, recessed portions 35 and 36 may be included in the separator parts 21 and 22, as shown in Figure 4 to enable one to start the separation of the parts 21 and 22.

If desired a cutting string or tape 40 may be included in the separator 21 and 22 as shown in Figure 5 to enable one to separate the two parts 21 and 22. This string or tape 30 can be sealed into the separator during manufacture and may contain an exposed loop or tab 42 to enable one to start the separation. If desired the tape or the starting end thereof may be colored so that one can see it through the wrapping paper or a small hole may be cut in the wrapping paper as shown at 41 to expose the opening tab 42.

A cutting string or tape may also be included in the wrapper as shown in Figure 6. For example, the wrapping paper may have a thin tape 50 adhered to the outside and another thin tape 51 adhered to the inside. These tapes 50 and 51 extend beyond the end or side 53 of the paper wrapping and are adhered together to form a pulling tab 52. Ordinarily the end or side 53 of the wrapping 10 will appear at the bottom of the loaf. When such a means is employed for separating the wrapping 10 it is sometimes preferable not to adhere the separator parts 21 and 22 together at all so that when the tape 50, 51 is torn off, the two parts of the loaf fall apart. The wrapper 10 is adhered to the rim of the part 21 as shown at 54 and to the rim of the part 22 as shown at 55.

The separator may be inserted into the wrapped package in the following way. A loaf of bread is run through a slicer in the known way, but as it comes from the slicer it is separated by one or more wedge devices which divides it into two or more parts. A preformed two part separator 21, 22 is then inserted between the parts, and the loaf of bread including the separator is then wrapped with wax paper 10. As the bread is wrapped or after it has been wrapped it is rotated between a pair of heater bars which are situated so as to heat the wax of the wrapping paper 10 about the area where the separator has been inserted. While heated the wrapping paper and the separator are caused to contact each other so that the paper is sealed to the separator.

The wrapper of the present invention is extremely useful when it is desired to sell half loaves of bread for small families or if it is desired to consume only a small portion of a loaf of bread. In those cases where a grocer desires to sell a half load of bread he merely strips the tab 23 from the outside of the bread and cuts the wrapper 10 above the line 25 by a knife or by running a finger nail along the line 25. And in this way the other half which he does not seal is adequately protected from drying out, from spilling, etc., and it requires no further wrapping. The exact proportion of the loaf desired is also obtained. When a housewife buys a whole loaf of bread packaged according to this invention she may not only protect one half of the loaf against drying out etc., but she can also start using the bread from the center of the loaf. Also when a single piece of bread is all that is desired, it may be obtained by removing the separator portion, extracting the piece of bread and replacing the separator thereby keeping the portion of the bread which is not being used relatively fresh until it is consumed.

Although certain specific embodiments of this invention have been shown and described, it will be understood that many modifications thereof are possible. This invention, therefore, is not to be restricted except insofar as is necessitated by the prior art and by the spirit of the appended claims.

I claim:

1. In a package containing bread, or cake, the combination of a paper wrapper for the perishable material with an insert adapted to separate portions of the material said insert having two substantially parallel flat sides of substantially the same cross sectional size as the material which is wrapped, said two sides being loosely connected to each other so as to be easily separable, said wrapper being adhered to at least a portion of each of the peripheries of the sides of said insert.

2. In a package containing bread, or cake, the combination of a paper wrapper for the perishable material with an insert adapted to separate portions of the said material said insert having two substantially parallel flat sides of substantially the same cross sectional size as the material which is wrapped, said two sides being loosely connected to each other so as to be easily separable, an adhered tape surrounding the wrapper at the line where the insert is adapted to be separated.

3. In a package containing bread, or cake, the combination of a paper wrapper for the perishable material with an insert adapted to separate portions of the said material said insert having two substantially parallel flat sides of substantially the same cross sectional size as the material which is wrapped, said two sides being loosely connected to each other so as to be easily separable, said wrapper being adhered to at least a portion of each of the peripheries of the sides of said insert, and adhered tape surrounding the wrapper at the line where the insert is adapted to be separated.

4. In a package containing bread, or cake, the combination of a paper wrapper for the perishable material with an insert adapted to separate portions of the said material said insert comprising two similar parts each comprising a flat area and containing a flange extending from the periphery of the flat area, said parts being adhered along the edges of the flanges thereof to produce an area of low resistance to separation.

5. In a package containing bread, or cake, the combination of a paper wrapper for the perishable material with an insert adapted to separate portions of the said material said insert comprising two similar parts which are mirror images of each other, each of said parts comprising a flat area and containing a flange extending from the periphery of the flat area, said parts being adhered along the edges of the flanges thereof, to produce an area of low resistance to separation.

6. In a package containing bread, or cake, the combination of a paper wrapper for the perishable material insert adapted to separate portions of the said material said insert comprising two similar parts which are mirror images of each other, each of said parts comprising a flat area and containing a flange extending from the periphery of the flat area, said parts being adhered along the edges of the flanges thereof, and means at least a portion of the edge of the flange of at least one of said separator parts to facilitate separation of the two parts of the separator.

WILLIAM SWARTZ.

REFERENCES CITED

The following references are of record in the file of this patent:

UNITED STATES PATENTS

| Number | Name | Date |
| --- | --- | --- |
| 1,811,772 | Willoughby | June 23, 1931 |
| 2,296,951 | Rosen et al. | Sept. 29, 1942 |
| 2,297,982 | Potts | Oct. 6, 1942 |
| 2,317,651 | Talbot | Apr. 27, 1943 |

OTHER REFERENCES

"Modern Packaging," Sept. 1941, pages 90, 91, 92.